Sept. 30, 1952 J. M. VAN ROOY 2,612,037
PROCESS FOR TESTING FLUID DUCTS
Filed Sept. 4, 1947 2 SHEETS—SHEET 1

INVENTOR.
Johannes M. Van Rooy
BY
Stevens, Davis and Miller
ATTORNEYS

Sept. 30, 1952 J. M. VAN ROOY 2,612,037
PROCESS FOR TESTING FLUID DUCTS
Filed Sept. 4, 1947 2 SHEETS—SHEET 2

INVENTOR.
Johannes M. Van Rooy
BY Stevens, Davis and Miller
ATTORNEYS

Patented Sept. 30, 1952

2,612,037

UNITED STATES PATENT OFFICE 2,612,037

PROCESS FOR TESTING FLUID DUCTS

Johannes M. van Rooy, The Hague, Netherlands, assignor of one-fourth to Hendrik Boer and one-fourth to Alida Johanna Oosterveen, both of The Hague, Netherlands Application September 4, 1947, Serial No. 772,115
In the Netherlands September 23, 1946

6 Claims. (Cl. 73—40.5)

The invention relates to a process for determining the magnitude (size) of a leakage in a duct for a fluid, for determining the place where there is a leakage in a duct, or for determining the diameter of a duct, and to a device for the execution of said process.

Determining the place where there is a leakage in a duct is mostly time consuming and costly, particularly when said ducts are disposed for example in the ground, in houses, etc. If, for example, a leakage should be found in a house, the floors must be broken up for said purpose. Determining the diameter of ducts disposed under floors, in walls, between ceilings and in other places which are accessible with difficulty always involves breakage and repairing operations too.

Said disadvantages are avoided by the process according to the invention by the fact that a gaseous fluid or successively a number of gaseous fluids is or are supplied to the duct the specific weight of said fluid(s) differing from the fluid in the duct, until a sudden variation in pressure sets in in the duct. Here the property of gases is availed of that the exhaust speed of the gases from an aperture is inversely proportionate to the root of the specific weight of the gaseous fluids. Air has a specific weight which is twice as large as that of the mixed gas used in gas ducts so that the exhaust speed of air through an opening is $\sqrt{2}$ or 1.4 times as small as that of mixed gas.

The amount of gaseous fluid which has been brought into a duct may then be measured, since, as soon as the gaseous fluid brought into the duct has forced the gaseous fluid being therein from the duct through the leakage, the pressure will suddenly rise or fall according as a fluid having a greater or a smaller specific weight is used. When the diameter of the duct is known, then it may be calculated with reference thereto where the leakage is in the duct. When the diameter of a duct is to be determined a puncture is made in said duct to cause a leakage and an amount of gas may be brought into the duct at a certain point from said leakage. As soon as said gas has forced away the gas being in the duct the pressure will suddenly rise or fall. By determining the amount of gas flown out of the leakage, consequently the amount of fluid supplied, and by measuring the length of the duct, the diameter of the duct may be calculated or be read from a table prepared for said purpose.

A preferred embodiment of the process according to the invention is characterized in that a reservoir is filled one or a number of times with a predetermined amount of gaseous fluid, and the amount of fluid is determined which has flown from said reservoir into the duct until the moment when in the fluid flowing in the duct a sudden change in pressure occurs. Hereby it becomes possible to make a compact and cheap device which may be applied in any required place and which may be transported thereto easily. Such a device may easily be taken along by gasfitters.

A preferred embodiment of the device for the execution of the process according to the invention is characterized in that it is provided with at least one apparatus for bringing a gaseous fluid into the duct and with a pressure responsive apparatus which indicates the sudden change in pressure in the duct. As an apparatus for bringing the gaseous fluid into the duct any device may be used, by means of which the fluid under pressure may be brought into the duct. This may consequently be a hand pump as well as a mechanically driven pump, a compressor, one or a number of reservoirs filled with the fluid under pressure, etc.

The pressure responsive apparatus need not indicate the pressure really prevailing in the duct, but it is sufficient that it indicates that a change in pressure sets in in the duct.

According to the invention the device for supplying the fluid may be provided with an apparatus for measuring the amount of fluid which has been brought into the duct until the moment of the sudden change in pressure. For measuring said amount any known measuring apparatus may be used, for example a gasmeter, a rotameter, a bell, which is in a liquid filled reservoir, so that from the sinking of the bell may be ascertained how much fluid has been brought into a duct, etc. It is also possible to use a measuring apparatus provided with an empirical scale. When a compressor or other device is applied producing a determined amount of fluid per unit of time the time may be measured during which said device has operated until the sudden change in pressure has occurred with reference whereto the amount of fluid supplied may be calculated. If necessary the device according to the invention is provided with an apparatus for measuring the pressure which prevails in the duct before the moment of the sudden change in pressure.

The apparatus for measuring the amount of fluid supplied to the duct and the pressure thereof may be self-registering, if required, so that it is not necessary to check the device permanently until the sudden fall in pressure occurs.

A preferred embodiment of the device according to the invention is characterized in that it is provided with one or a number of pressure reducing means which may be executed as flow limiting means or contractions of various sizes of the flow passage for the fluid to be supplied to the duct. Preferably said means are made adjustable.

The invention will be described more fully below with reference to the drawings in which by way of example some embodiments of the device according to the invention are represented.

Figure 1:
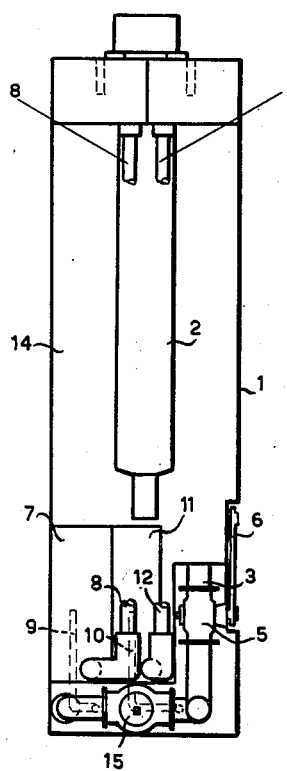
Figure 1 shows a front view of the first embodiment, the front wall being broken away.
Figure 2:
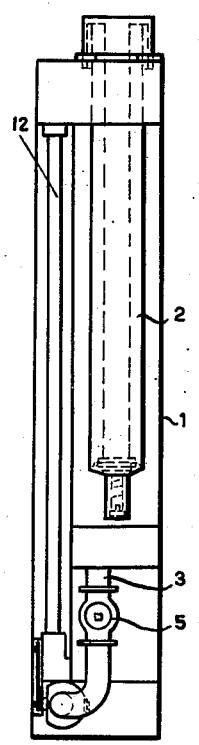
Figure 2 shows a side view, the side wall being broken away.
Figure 3:
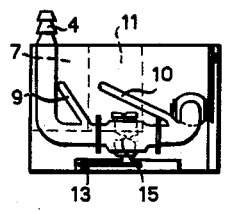
Figure 3 shows part of said device on an enlarged scale.

The device represented in the Figures 1–3 comprises a casing 1 in which a hand pump 2 is disposed with which air may be pumped into the casing 1 which contains a storage reservoir 14 for a gaseous fluid under pressure. This reservoir 14 communicates through a pipe 3 with a pipe stump 4 which is connected to the duct to be checked or measured by means of a rubber hose (not shown).

In said pipe a control means 5 is disposed which may be adjusted with an operating means 6 located on the outside of the casing 1. Said control means serves to keep the pressure of the gaseous fluid in a reservoir 7 constant. Said pressure may be read from a gauge 8 communicating with said reservoir 7. The pipe 3 is connected to the reservoir 7 by means of a branch duct 9. Said branch duct 9 extends above the level of a liquid in the reservoir 7 being present in the under part of said reservoir.

Furthermore the pipe 3 is connected through a branch duct 10 to a second reservoir 11 in which there is also a liquid. The branch duct 10 extends again above the level of said liquid. The reservoir 11 is connected to a second gauge 12 having a more or less empirical scale.

In the example illustrated the gauges 8 and 12 comprise small glass tubes in which the liquid level can be observed.

Between the branch ducts 9 and 10 in the pipe 3 a contraction or a flow limiting means 15 is disposed preferably two or more of such flow limiting means being present, so that by means of an operating handle 13 extending outside the casing 1 the device may be adjusted to various measuring ranges.

Instead of the air pump 2 a container may be connected to the reservoir 14 in which container there is a gaseous fluid under high pressure which is admitted into the casing 1 by means of a reducing valve.

If one desires to determine if a gas duct is leaky one proceeds as follows:

The device is connected at an arbitrary point to the duct to be checked, the main cock of the gas duct or line is closed, and the control means 5 is adjusted in such a way that the pressure of the fluid in the gauge 8 has the magnitude for which the empirical scale of the gauge 12 is gauged. When the liquid in the gauge 12 remains on the same level, the duct is in order. If there is a leakage in the duct then the pressure loss of the flow-limiting means between the two gauges indicates the magnitude of the leakage which pressure loss may be read from the gauge 12. According as the leakage will be greater it will be necessary to open the control means 5 further in order to keep the pressure of the gauge at the required value for which the pressure in the gauge 12 rises.

For determining the place where there is a leakage, for example in a gas duct, one proceeds as follows:

The device is connected again to the gas duct by means of a rubber hose secured to the pipe stump 4, whereafter the main cock of the gas duct or line is closed, and the control means is adjusted in such a way that the gauge 8 indicates the required pressure. When the column of the fluid brought into the gas duct reaches the leakage the pressure in the gauge 8 will suddenly rise or fall due to the slower or quicker outflow through the leakage of the fluid pumped into the gas duct and the higher inlet pressure. The time is measured from the admission of the fluid into the gas duct till the sudden rise of the pressure indicated by gauge 8 while from the empirical scale of the gauge 12 before the sudden rise of the pressure the number of liters of gas is read, which flows away through the leakage per minute. The product of the number of minutes which the fluid is admitted into the gas duct and the read number of liters of gas flowing away per minute indicates the contents of the duct between the device and the leakage.

A table upon which the contents of pipes having different diameters per meter are indicated makes it easy to determine the length of the duct.

If, for example, a leakage of 60 l./h. has been registered and the time of supply of the fluid to the gas duct until the sudden change in pressure occurs amounts for example to 1.4 minutes the total amount of fluid pumped in is $$\frac{1.4}{60} \times 60 \times 1000 = 1400 \text{ cm.}^3$$

Assuming that the duct has a diameter of ¾" a length of 5 m. is read from the table (the contents of 1 m. of gas duct with a diameter of ¾" is namely 280 cm.³).

For determining the diameter of a duct e. g. under a floor or in a wall one proceeds as follows:

At one end of the duct a small leak is made by means of a small tap, and the device is connected to the other end of the duct. In the same way as indicated above with regard to the search for a leakage the amount of the fluid brought into said duct is measured. After measuring the length of the duct the diameter of the duct may be calculated or be read from a table prepared for said purpose.

Figure 4:
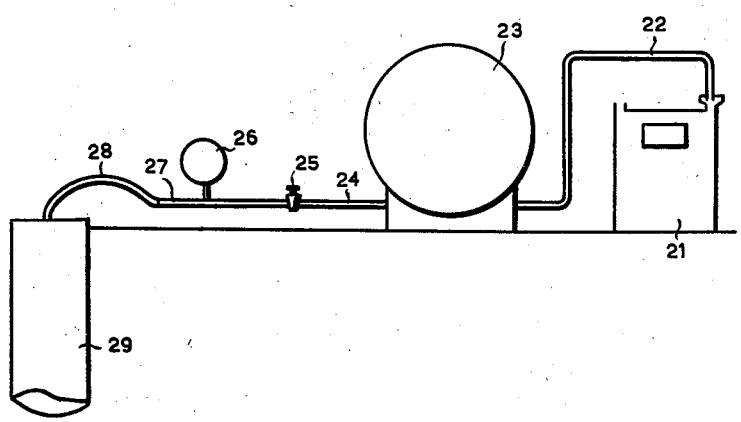
Figure 4 represents schematically a second embodiment.

In the embodiment according to Figure 4 a small gasmeter 21 is connected through a pipe 22 to a compressor 23. Said compressor may be made in such a way that gas having a constant pressure is supplied therefrom. The compressor 23 is connected through a pipe 24 in which there is a control cock 25 to a pressure gauge 26 which is provided with a pipe stump 27 which is connected through a flexible hose 28 to a liquid duct 29 which must be checked for gas leakages.

The above-described device operates as follows:

After the device has been connected to the liquid duct 29 the compressor is put into action and the control cock 25 is adjusted in such a way that the gas with a predetermined constant pressure is supplied to the duct 29. The amount of gas is measured by means of a small gasmeter 21. As soon as the gas, for example air, has reached the leakage, it will flow away more rapidly through the leakage. Hereby a sudden fall in pressure will occur indicated by the gauge 26. At this moment the compressor 23 is stopped and the amount of gas supplied is read. If the gas in the duct had an overpressure of 1 atm. before reaching the leakage, and 400 liters of gas were supplied, the contents of the duct to the measuring place are 0.5×400 litres=200 litres. If the section of the duct is 100 cm.² then the leakage is consequently between $$\frac{200,000}{100} = 2000 \text{ cm.}$$

or 20 m. from the measuring place.

The magnitude of the gas pressure at any arbitrary moment is of no importance, but only the pressure of the gas in the duct need be measured just before the pressure suddenly falls or disappears.

It is stated that when defining the place of a leakage the liquid sometimes flows away from the duct so rapidly that a constant pressure cannot be maintained at the beginning of the gas supply. According as, however, the liquid column in the duct will fall, the pressure exercised by the liquid-column above the leakage will become smaler and smaller, so that the outflow speed of the liquid through the leakage will decrease regularly. Hereby the gas in the duct will practically always have the predetermined constant when reaching the leakage with small overpressures of the gas supplied so that practically always a gauge may be used which is not provided with a scale or comprises a rough scale.

The gauge 26 as well as the gasmeter 21 may be self-registering. Hereby mistakes on reading are avoided whereas the operation of the apparatus becomes easy. Furthermore the gauge may be provided with an adjustable stop, if requried, which stops the supply of gas with the sudden fall of the pressure.

Figure 5:
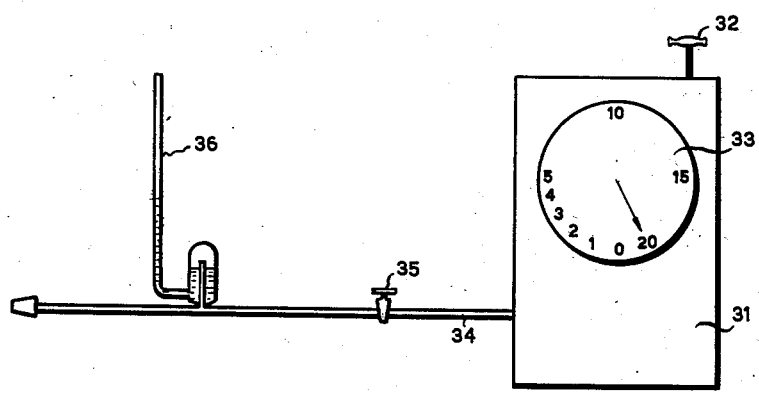
Figure 5 is a schematic view of a third embodiment.

In Figure 5, 31 is a reservoir which is provided with a hand air pump 32 with which the reservoir may be filled to the required pressure. By the fact that a motor is not necessary the device according to the invention may be used in any required place. A pressure responsive apparatus is provided with at least one scale 33 on which the number of liters of gas flown out of the reservoir at a predetermined presssure may be read. Said scale may be obtained by calculation so that an empirical gauged scale is not necessary.

The reservoir 31 is provided with a pipe stump 34 in which a cock 35 is provided. Following said cock in the pipe a gauge 36 is disposed. The pipe stump 34 may be connected to a duct to be checked by a hose.

If it is required to determine the place of a leakage in a vertical liquid duct by means of said device the cock 35 is slowly opened, so that it is wholly open as soon as about half or even of the gas has flown out of the reservoir 31. The number of liters of gas flown out of the reservoir 31 is constantly read on the scale 33, so that the number of liters of air flown out of the reservoir 31 is known just before a sudden fall in pressure sets in which is indicated by the gauge 36. Said number of liters is the contents of the duct from the point of measuring to the leakage. If required the apparatus having the scale 33 may also be made self-registering.

If the duct to be checked should be filled with air, a gaseous fluid should be used which has another specific weight than air, for example mixed gas or carbonic acid.

When a gas duct is checked air as a gaseous fluid may be used. In this case a rise in pressure in the duct indicates the moment at which the air reaches the leakage.

It is clear that in the above only an embodiment by way of example has been represented, and that the device may be varied in several ways without departing from the scope of the invention. For example, carbonic acid tablets may be used producing a predetermined amount of gas. The second reservoir may also be filled a number of times with a fluid having a determined pressure during the checking operation. The first reservoir is then emptied to a determined limit, whereafter the valve in the connecting stump of the first reservoir is closed and the valve between the two reservoirs is opened till a compensation of pressure in the two reservoirs has set in. Then the amount of gaseous fluid which has supplementary been brought into the reservoir is known exactly. If required this may be repeated some times. Due to said construction as well as by operating with masses yielding a predetermined amount of gaseous fluid the dimensions of the device according to the invention may be decreased considerably. If the second reservoir is also provided with an apparatus with which the amount of fluid flowing out of it may be measured it is evidently not necessary to close the cock 35 when one desires to replenish the reservoir 31. When the second reservoir is provided with such a measuring apparatus the measuring apparatus in the first reservoir may be eliminated. After the cock 35 has been closed in case of a sudden fall or rise of the pressure the valve between the two reservoirs is wholly opened, and, after the pressure compensation has set in the amount of fluid flown out at a determined pressure or about at said pressure may be read from said measuring apparatus or calculated by means thereof. The scale may be executed in such a way that a direct reading both of the amount pumped or brought into the second reservoir and the amount of gaseous fluid flowing out of the device is possible.

It is stated that all the above-described elements may be disposed in or on the device so that a unitary device is obtained.

It is clear that various other constructions of the reservoirs may be designed with which the process according to the invention may be executed. For example the one reservoir may be made to switch in the other, when the former reservoir is empty, whereby simultaneously the connection of the latter reservoir to the duct is interrupted, and said reservoir is filled again automatically, etc. The reservoirs may also be filled manually, etc. The constructions of such reservoirs do not involve any difficulties for some one skilled in the art.

If the above-described device is used for checking vertical or sloping ducts filled with liquid the outflow speed of the gaseous fluid used differs so much from that of liquids that when the gas reaches the leakage it will escape so readily through the leakage that the pressure is suddenly eliminated. In this case the scale 33 already indicates the fall in pressure so that with an opened cock the gauge 36 is really superfluous.

In the embodiment according to figure 5 the amount of gaseous fluid brought into the duct may be determined in a simple manner by determining the amount of gaseous fluid being in the reservoir at the moment when the sudden change in pressure sets in and by subtracting said amount from the amount being originally in the reservoir.

When checking gas ducts in private houses the pressure of the fluid brought into the duct need only be low and an overpressure of for example 10 cm. of water is already sufficient. The valve is adjusted in such a way that said pressure is indicated by the gauge 36. During the outflow of the gaseous fluid from the reservoir the pressure therein will fall, whereby the pressure in the gauge will also fall slowly. If required the valve 35 may be adjusted somewhat during the outflow so that the pressure in the duct keeps the value adjusted initially or reaches it again. Since, however, the overpressure in the duct is low, rather great differences in the pressure indicated by the gauge will not influence the exactness of the measuring apparatus in the reservoir for the amount of fluid flown out.

In order to indicate clearly the change in pressure of the fluid in the duct the pipe of the gauge 36 may be helical, whereby with a small change in pressure the liquid in this case displaces itself along a large distance in the pipe.

It will be understood that in the above only some embodiments of the device according to the invention have been given and that it may be varied in numerous ways without departing from the scope of the invention. This applies both to the apparatus for bringing the gaseous fluid into the duct, and for the apparatus for measuring the amount and the pressure of the fluid brought into the duct, and for the apparatus for indicating the sudden change in pressure occurring in the fluid. Herefor all apparatus known per se may be used.

I claim:

1. A process for leakage detection in a fluid-filled duct comprising introducing a gaseous testing medium into said duct from a source of supply, said gaseous testing medium differing in specific weight from the specific weight of the gaseous medium normally within the duct, and continuously measuring the pressure of said mediums until such measurement indicates a sudden change of pressure produced by the differential between said specific weights at the point of leakage.

2. A process for leakage detection in a fluid-filled duct comprising introducing from a source of supply a gaseous testing medium into a pressure-responsive apparatus and thence into said duct, said gaseous testing medium differing in specific weight from the specific weight of the gaseous medium normally within said duct, and continuing the introduction of said gaseous testing medium until said pressure-responsive apparatus indicates a sudden change of pressure produced by the differential between the specific weights of said mediums when the gaseous testing medium reaches a point of leakage.

3. A process for testing a fluid-filled duct for the point of leakage comprising supplying at least one gaseous testing fluid to said duct until the moment when a sudden change in pressure of the supplied gaseous testing fluid occurs, the specific weight of said supplied gaseous testing fluid differing from the specific weight of the fluid being present in said duct, measuring the amount of gaseous testing fluid introduced into said duct until the moment when the sudden change in pressure occurs and from the ratio of the fluid introduced to the volume of said duct calculating the point of leakage.

4. A process for testing a fluid-filled duct for the point of leakage comprising supplying at least one gaseous testing fluid to said duct until the moment when a sudden change in pressure of the supplied gaseous testing fluid occurs, the specific weight of said supplied gaseous testing fluid differing from the specific weight of the fluid being present in said duct, measuring the amount and the pressure of the testing fluid introduced into said duct until the moment when the sudden change in pressure occurs and from the ratio of the fluid introduced to the volume of said duct calculating the point of leakage.

5. A process for detecting the point of leakage in a fluid-filled duct comprising introducing a gaseous testing medium into said duct from a source of supply, said gaseous testing medium differing in specific weight from the specific weight of the gaseous medium normally within the duct, and continuously measuring the pressure of said mediums until such measurement indicates a sudden change of pressure produced by the differential between said specific weights at the point of leakage, continuously measuring the volume of said gaseous testing medium introduced into said duct until the measurement of the pressure of said mediums indicates said sudden change and thereafter calculating from such measurements and the volume of said duct the distance between the point of introduction of said gaseous testing medium and the point of leakage.

6. A process for detecting the point of leakage in a fluid-filled duct comprising introducing from a source of supply a gaseous testing medium into a pressure-responsive apparatus and thence into said duct, said gaseous testing medium differing in specific weight from the specific weight of the gaseous medium normally within said duct, and continuing the introduction of said gaseous testing medium until said pressure-responsive apparatus indicates a sudden change of pressure produced by the differential between the specific weights of said mediums when the gaseous testing medium reaches a point of leakage, measuring the volume of testing medium introduced until said pressure-responsive apparatus indicates said sudden change of pressure and thereafter calculating from such measurement and the volume of said duct the distance between the point of introduction of the gaseous testing medium and the point of leakage.

JOHANNES M. van ROOY.

REFERENCES CITED

The following references are of record in the file of this patent:

UNITED STATES PATENTS

| Number | Name | Date |
|---|---|---|
| 1,196,828 | Weatherson | Sept. 5, 1916 |
| 1,422,089 | Dezendorf | July 11, 1922 |
| 1,706,567 | Dezendorf | Mar. 26, 1929 |
| 1,985,348 | Henneberger | Dec. 25, 1934 |
| 2,374,154 | Moore | Apr. 17, 1945 |
| 2,446,632 | Cahill et al. | Aug. 10, 1948 |
| 2,449,556 | Kirkley | Sept. 21, 1948 |

FOREIGN PATENTS

| Number | Country | Date |
|---|---|---|
| 528,072 | Great Britain | Oct. 22, 1940 |